INVENTORS
SHAIRYL I. PEARCE
DALE C. THORNE
JAMES G. STARLING
BY
ATTORNEYS

INVENTORS
SHAIRYL I. PEARCE
DALE C. THORNE
JAMES G. STARLING

BY

ATTORNEYS

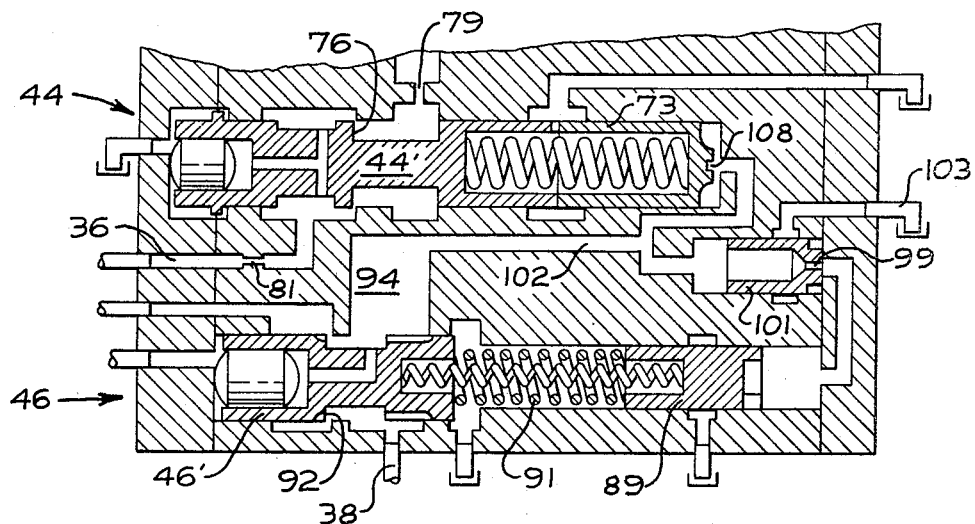
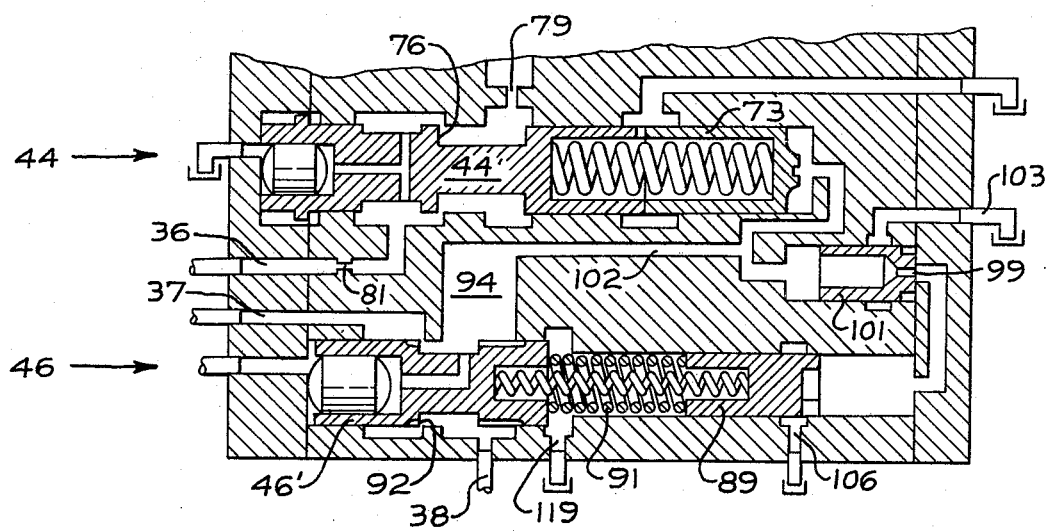

United States Patent Office 3,481,435
Patented Dec. 2, 1969

3,481,435
TRANSMISSION SHIFT CONTROL
Shairyl I. Pearce, East Peoria, and Dale C. Thorne and James G. Starling, Pekin, Ill., assignors to Caterpillar Tractor Co., Peoria, Ill., a corporation of California
Filed June 19, 1968, Ser. No. 738,261
Int. Cl. F16d 41/24; F16h 57/10
U.S. Cl. 192—4                                    12 Claims

ABSTRACT OF THE DISCLOSURE

A vehicle transmission is shifted by applying fluid pressure to a selected one of a plurality of speed clutches and to a selected one of a pair of directional clutches and is provided with a system for applying actuating fluid to the selected pair of clutches which precisely coordinates the engagement of the two clutches to achieve a smooth shift performance. A first reducing valve supplies fluid to the selected speed clutch and to a second reducing valve which in turn supplies fluid to the selected directional clutch. The rising pressure at the directional clutch modulates the two reducing valves to produce a first rate of pressure rise at the speed clutch and a lesser rate of pressure rise and a lesser maximum pressure at the directional clutch.

BACKGROUND OF THE INVENTION

This invention relates to drive transmissions for powered vehicles and the like and more particularly to fluid circuitry for actuating selected drive conditioning devices in such transmissions to obtain a desired speed range and drive direction.

Many transmissions contain fluid pressure operated clutches or brakes of which selected sets are actuated to accomplish a shift. Generally, at least two such drive establishing devices must be actuated to effect a shift, one being a directional device for selecting forward or reverse drive and the other being a speed range selecting device.

In order to achieve acceptably smooth shifts, careful coordination of the engaging action of both devices is necessary. This may be complicated in that the optimum pressure conditions in the two devices are not necessarily the same at any given time. Clutch capacities may differ and different rates of pressure rise may be desirable. Further, it may be desirable that one particular drive conditioning device, such as the directional clutch for example, always be the one which re-establishes drive through the transmission. This requires that the other device be fully engaged before the first device reaches this condition. Further, the initial pressures and the maximum pressures for the two devices are not necessarily the same. Smooth shifting performance under the conditions outlined above requires a relatively complex valve group which applies a gradually increasing pressure to both devices but at different rates and starting from different base pressures while time sequencing full engagement of one device relative to the other in the preferred manner and which maintains the final pressures applied to the two valves at the desired different values.

A variety of fluid circuits have been developed for controlling the engagement of two drive conditioning devices in transmissions. U.S. Patent No. 3,181,394 of C. A. Ramsel et al., issued May 4, 1965; U.S. Patent No. 3,198,027 of C. A. Ramsel et al., issued Aug. 3, 1965; U.S. Patent No. 3,217,726 of G. D. Rohweder et al., issued Nov. 16, 1965; and U.S. Patent No. 3,386,540 of Joachim Horsch et al., issued June 4, 1968 and assigned to the assignee of this application; each disclose controls of this general type but do not operate in a manner comparable to the present invention. Further, no simple adjustments can be made in these prior systems to accommodate the different operating conditions described above.

SUMMARY OF THE INVENTION

The present invention provides fluid control mechanism for precisely coordinating the engagement of two drive establishing devices to achieve a smooth rapid shift of a transmission wherein the fluid pressures applied to the two devices start from different levels, rise at different rates to different maximum levels and wherein full engagement of one device occurs slightly later than full engagement of the other. Actuating fluid for both devices is supplied through a first reducing valve with the actuating fluid for the device which engages last being metered through a second reducing valve as well. A fluid pressure signal reflected back from the last engaging device acts on both reducing valves to modulate the output pressures therefrom in the desired manner. The invention includes further structure for optimizing shift performance including means for enhancing the flow capacity and modulation range of the reducing valve means and means for eliminating disturbances from brief pressure surges.

Accordingly, it is an object of this invention to provide for optimized shifting performance in transmissions having fluid actuated drive establishing devices wherein different actuating fluid pressures and different rates of pressure change are required by two such devices at various stages of a shift while maintaining a predetermined relationship between the two pressures.

It is another object of this invention to increase the flow capacity of modulated pressure reducing valves in fluid pressure controlled transmission systems while providing for a very broad pressure modulation range.

The invention, together with further objects and advantages thereof, will best be understood by reference to the following description of preferred embodiments in conjunction with the accompanying drawings.

BRIEF DESCRIPTION OF THE DRAWINGS

In the accompanying drawings:

FIG. 3 is a view of a portion of the actuating fluid pressure control valve means of FIG. 1 illustrating the positions of movable elements thereof when a shift of the transmission has been initiated and actuating fluid is being delivered to the selected pair of the drive establishing devices and is in the process of engaging both thereof;

FIG. 4 is an additional view of the portion of the apparatus shown in FIG. 3, but with the movable elements thereof shifted to the positions assumed when the transmission shift has been completed and the drive established elements are both fully engaged.

DESCRIPTION OF THE PREFERRED EMBODIMENTS

Figure 1:
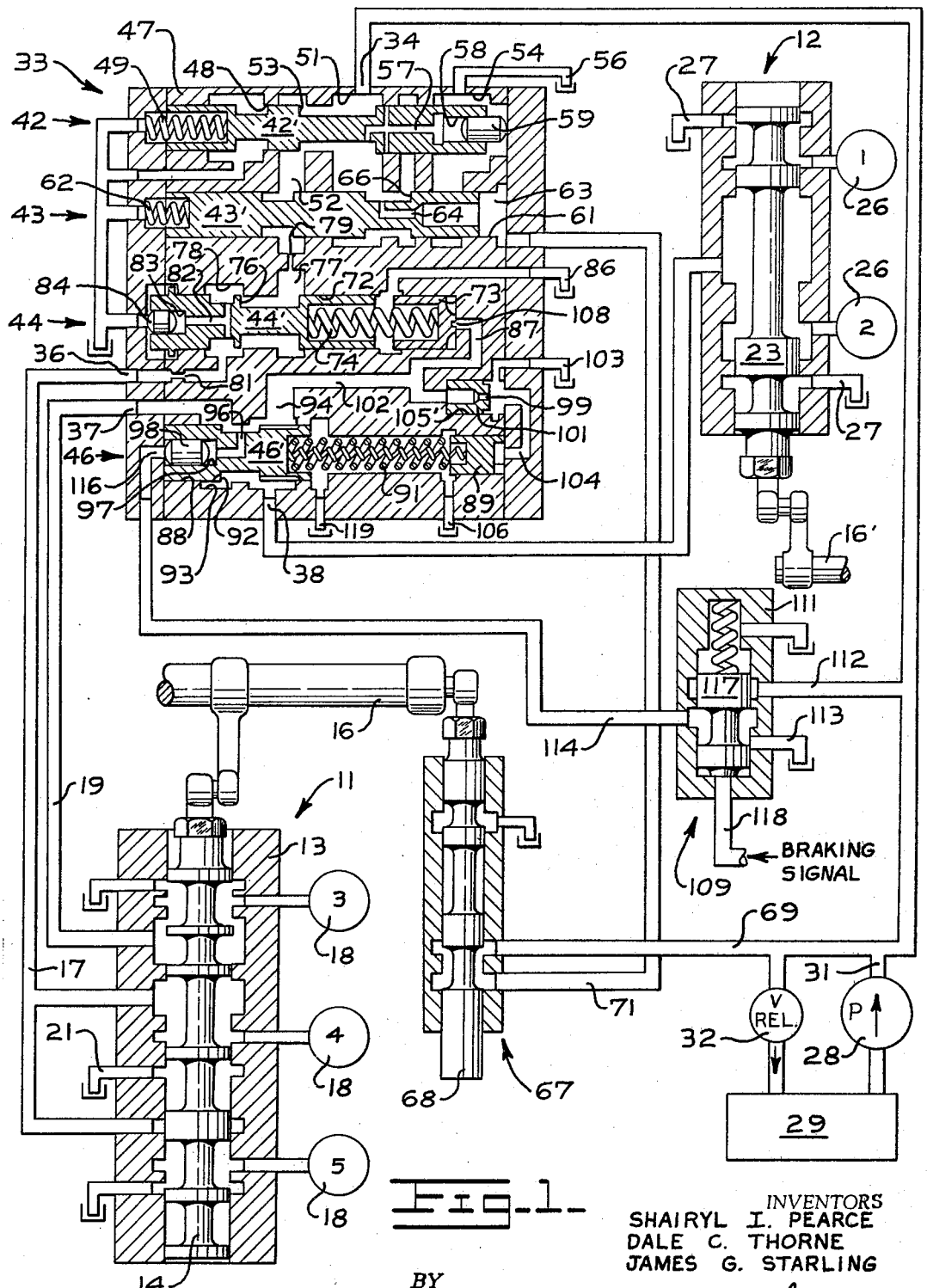
FIG. 1 is a diagrammatic view of the speed and direction selecting elements of a transmission, together with means for supplying actuating fluid thereto in accordance with the invention, the mechanism being shown in the positions assumed when the transmission is in neutral.

Referring now to the drawings and more particularly to FIG. 1 thereof, certain of the drive establishing components of a vehicle transmission are shown including a speed selector valve 11 and directional selector valve 12. Speed selector valve 11 is comprised of a housing 13 and spool 14 which may be shifted axially therein by appropriate shift linkage 16 to direct working fluid from an inlet conduit 17 to a selected one of three fluid operated drive establishing clutches 18 which may be of the known type utilized in transmissions for engaging or disengaging elements to establish a selected power path through the transmission. For purposes to be hereinafter described, the speed selector valve 11 returns a portion of the working fluid from inlet conduit 17 to an outlet conduit 19 at any of the speed settings of the transmission and has the further property of venting any of the clutches 18 to a suitable drain 21 except at such times as the particular clutch is to be engaged.

Directional selector valve 12 is of an essentially similar type with a housing 22 and axially movable spool 23 which is shifted by linkage 16' to direct working fluid from an inlet conduit 24 to a selected one of two drive conditioning clutches 26 which provide for either forward or reverse drive through the transmission according to which one is energized. Directional selector valve 12 further vents the particular one of the directional clutches 26 which is not receiving working fluid to suitable drain means 27.

Working fluid under pressure for operating the selected speed clutch 18 and directional clutch 26 is provided by a pump 28 having an intake communicated with a fluid reservoir 29 and having an outlet conduit 31. To maintain the working fluid pressure in conduit 31 at a constant value in the presence of variations of pump speed and variations of downstream conditions, a relief valve 32 is connected between the outlet conduit 31 and reservoir 29.

During the shift transient, it is necessary that the timing and rate of engagement of the two selected clutches 18 and 26 be carefully coordinated in accordance with characteristics of the clutches and the transmission as a whole. In order to achieve this result, a control valve group 33 receives working fluid from pump outlet conduit 31 at an inlet 34 in order to modulate the working fluid pressure and to perform certain other operations thereon as will hereinafter be described. Control group 33 has a first outlet 36 at which fluid is transmitted to the speed clutch selector valve inlet conduit 17 and has an additional inlet 37 to which the return conduit 19 from speed clutch selector valve 11 is coupled. Inlet 37 thus receives the portion of the working fluid which is returned by the speed clutch selector valve as previously described. The returned fluid is further modulated and regulated as hereinafter described and transmitted to an additional outlet 38 of the control group 33 to which the inlet conduit 24 of directional clutch selector valve 12 connects. Thus, the selected directional clutch 26 is actuated by the fluid returned from the speed clutch selector valve 11.

Figure 2:
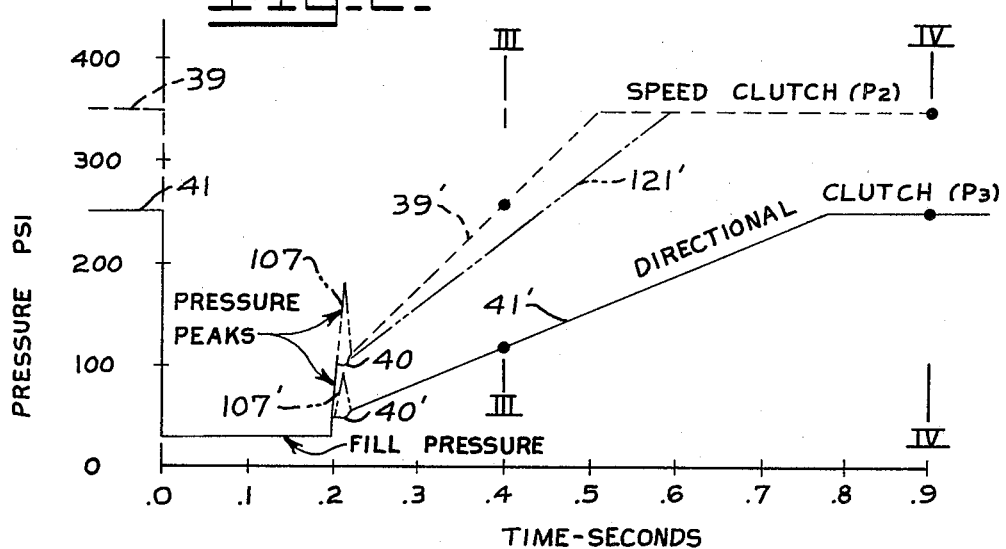
FIG. 2 is a graph of actuating fluid pressure against time for two drive establishing devices illustrated in FIG. 1 during the shifting transient of the transmission.

FIG. 2 graphically illustrates the rates of pressure rise and time sequencing which are required for optimum performance in a transmission of the class to which the invention is applicable. While specific pressure and time values are indicated in FIG. 2, it should be understood that these are for purposes of example and may very somewhat according to the characteristics of the specific transmission with which the invention is employed.

During a period when the transmission is transmitting drive, the working fluid pressures required at the engaged speed clutch and engaged directional clutch are not identical, due to differences in clutch capacities and other factors. Thus, the engaged speed clutch may have a working fluid pressure of 350 p.s.i. as indicated by dashed line 39 in FIG. 2, while the directional clutch may have a maximum pressure of 250 p.s.i. as indicated by solid line 41. At the start of a shift period, both such clutches are vented whereby the working fluid pressures thereat drop a minimal value. When the shift period begins, a first portion thereof, typically about 0.2 second, is occupied in refilling the selected clutches and during this operation the fluid pressures thereat remain fairly constant at some low fill pressure. Thereafter, as the clutches begin to engage in the modulation period, the pressures at both clutches rise, but not at the same rate as indicated by lines 39' and 41' in FIG. 2. Moreover the base levels 40 and 40' from which the two clutches begin their modulated pressure rises differ. Further, for optimum shifting performance, it is necessary that one of the clutches, the speed clutch in this instance, reach its maximum pressure or full engagement prior to the time that the other clutch fully engages. In this example, the speed clutch reaches its maximum pressure of 350 p.s.i. at time 0.5 second whereas the directional clutch does not reach its maximum of 250 p.s.i. until time 0.8 second. This time sequencing assures that it is always the directional clutch which picks up the load with respect to restoring the full transmission of torque through the transmission.

Referring again to FIG. 1, the control valve group 33 regulates the supply of working fluid to both speed selector valve 11 and directional selector valve 12 to achieve the conditions described above with reference to FIG. 2. As will hereinafter be described in more detail, this is accomplished in part by referencing the fluid pressure supplied to the directional clutch 26 to the fluid pressure at the speed clutch 18 and by modulating both pressures as a function of the pressure at the directional clutch.

Control valve group 33 has four principal valving sections including a sequence valve section 42, safety valve section 43, modulating, reducing and proportioning valve section 44 and a reducing and modulating valve section 46, each situated in a common housing 47 in this instance.

Sequence valve section 42 is comprised of a spool 42' disposed for axial movement in a bore 48 and having a biasing spring 49 of the compression type exerting an axial force on one end thereof. Spring 49 urges the spool rightwardly in the embodiment of the invention shown in FIG. 1. The working fluid inlet 34 of the valve group 33 communicates with a chamber 51 of bore 48 which in turn communicates with an adjacent chamber 52 therein past an edge 53 of the spool 42'. Bore 48 also has a chamber 54 at the end opposite spring 49 which is communicated with a drain 56. A passage 57 in spool 42' communicates the pressure in chamber 51 with an axial well 58 in the end of spool 42' in which a reaction slug 59 is disposed so that the fluid pressure within chamber 51 in effect urges the spool 42' leftwardly against the action of spring 49. Sequence valve section 42 of the control group, in addition to other purposes to be described, interacts with the safety valve section 43 to block any engagement of the clutches 26 upon starting up of the associated vehicle engine, until the shift linkage 16 has first been conditioned to neutral. To understand this operation of the sequence valve section, it is first necessary to consider also the structure of the safety valve section 43.

Safety valve section 43 also has a spool 43' slidably disposed in a bore 61 of housing 47 and biased rightwardly by a compression spring 62. The force of spring 62 is opposed by fluid pressure in a chamber 63 at the opposite end of the spool 43' which pressure is derived in part from chamber 51 of sequence valve section 42 through a passage 64 in spool 43'. Safety spool 43' is further provided with an edge 66 which communicates sequence valve section chamber 51 with chamber 54 thereof when the safety spool 43' is shifted rightwardly and thus diverts incoming working fluid at inlet 34 to drain 56 at such times.

The position of safety valve spool 43' is controlled in part by a safety reset valve 67 having a valve spool 68 controlled by the linkage 16 which operates the speed clutch selector valve 11. Safety reset valve 67 is coupled to the fluid outlet 31 of pump 28 and to chamber 63 of the control valve group 33 by conduits 69 and 71, respectively, and operates to apply the pump outlet fluid pressure to chamber 63 when linkage 16 is at the transmission neutral position.

Considering now the operation of the above described elements to block engagement of any of the drive conditioning clutches 18 and 26 except when the transmission has first been conditioned to neutral, it should be observed that the working fluid which effects such clutch engagements is delivered to chamber 51 of sequencing valve section 42 and must pass the edge 53 of spool 42' in order to reach chamber 52 from which it is eventually passed to the drive establishing clutches. Thus, with spool 42' shifted rightwardly by the force of spring 49, edge 53 closes chamber 52 and no flow of working fluid to the clutches is possible. Spool 42' remains in this rightward position as long as safety spool 43' is also shifted rightwardly by its spring 62, since at this time chamber 51 is communicated with drain 56 through passage 57 and past edge 66 and thus the pressure acting against reaction slug 59 is inadequate to move spool 42' against the force of spring 49. This same low pressure is transmitted to chamber 63 through passage 64 where it is also inadequate to force the safety spool 43' leftwardly against spring 62.

When the transmission is conditioned to neutral, safety reset valve 67 supplies full working fluid pressure to chamber 63 thereby forcing safety spool 43' to the left against the force of its spring 62. This cuts off communication between chamber 53 and drain 56 causing the fluid pressure in well 58 of spool 42' to rise and eventually to move the spool leftwardly against its spring 49. This causes edge 53 to shift leftwardly allowing the working fluid to enter chamber 52 and thus to be transmitted on toward the drive conditioning devices 18 and 26 as will hereinafter be described. It should be noted that spools 42' and 53' remain in their leftward positions until the working fluid pressure is lowered, even though linkage 16 is subsequently manipulated out of the neutral setting. Although this stops the supply of working fluid pressure to chamber 63 through safety reset valve 67, such pressure continues to be supplied thereto through the passage 64 in spool 43'. Spools 42' and 43' shift back to the right only when pump 28 stops. Thus the above described operations prevent clutch engagements upon starting up the associated engine until the transmission is put into neutral.

Modulating, reducing and proportioning valve section 44 of control valve group 33 functions basically to regulate the flow of working fluid from the previously described chamber 52 to the outlet 36 leading to speed clutch selector valve 11. For this purpose, valve section 44 has a spool 44' slidably disposed in a bore 72. Also disposed in bore 72 in co-axial relationship to spool 44' and at the right end thereof in this instance is a load piston 73. A compression spring 74 extends between spool 44' and piston 73 to urge the two members toward their respective opposite ends of bore 72. To control the flow of working fluid to outlet 36 as will hereinafter be described in more detail, spool 44' has an edge 76 defining a variable flow passage between two chambers 77 and 78 of bore 72. Chamber 77 receives working fluid from chamberd 52 through an upstream orifice 79 and chamber 78 transmits fluid to the outlet 36 through a downstream orifice 81. The spring force acting on spool 44' is opposed by the fluid pressure within chamber 78 in that a passage 82 in the spool communicates such pressure with a well 83 in the left end of the spool which has a reaction slug 84 received therein. The region of bore 72 in the area of the adjacent ends of spool 44' and load piston 73 is communicated with a drain 86, and a passage 87 in valve housing 47 communicates with the right end of bore 72 to apply a fluid control signal to the end of load piston 73 as will hereinafter be described. The operation of the modulating, reducing and proportioning valve section 44 is interdependent with that of the modulating and reducing valve section 46; and accordingly, the structure of the latter will now be described.

Control group valve section 46 has a spool 46' disposed for axial movement within a bore 88 which also contains an axially movable load piston 89 at the right end in this instance. Spool 46' and piston 89 are urged in opposite directions by a pair of compression springs 91 situated therebetween. Spool 46' carries an edge 92 for metering fluid flow between a pair of chambers 93 and 94 of bore 88 with chamber 93 being communicated with the previously described working fluid return line 19 from speed clutch selector valve 11 at inlet 37. The other chamber 94 connects with outlet 38 to provide fluid to the directional clutch selector valve 12. Thus, spool 46' in effect controls the flow of fluid to the selected directional clutch 26. To vary the position of spool 46' for this purpose, a passage 96 therein communicates the fluid pressure in chamber 94 with a well 97 at the end of the spool opposite the spring 91 and in which a reaction slug 98 is disposed. The position of the spool 46' at any time is thus a function of the opposed forces of springs 91 and the fluid pressure of chamber 94.

Load piston 89 functions to change the effective force of spring 91 on spool 46' by shifting leftwardly in the course of a modulation period as will hereinafter be discussed in more detail. Piston 89 is driven for this purpose by fluid pressure derived from chamber 94 through an orifice 99 in a check valve 101. Such pressure is transmitted to check valve 101 through a passage 102 in valve body 47 which is branched to supply the previously described fluid pressure signal to the load piston 73 of valve section 44 in addition to supplying such pressure to load piston 89 through orifice 99. Check valve 101 is an axially movable sleeve disposed in an enlarged section 105' of passage 102 and having a leftward position at which the passage 102 downstream of check valve orifice 99 is vented to a drain 103. At the rightward position of the check valve 101, drain 103 is blocked and any fluid transmitted through orifice 99 is passed to the face of load piston 89 through a passage 104 in valve body 47.

Load piston 89, when shifted leftwardly by an increasing fluid pressure in chamber 94, acts to increase the force of spring 91 against spool 46' as will hereinafter be discussed. The action is limited by a drain 106 positioned to be communicated with passage 104 when the load piston 89 reaches its limit of leftward travel.

Considering now the operation of the valve control group 33 as a whole to realize the preferred clutch engagement characteristics, it will be assumed that the shift linkage 16 has been manipulated to condition the transmission to neutral and therefore that sequence valve section 42 and safety valve section 43 have operated as hereinbefore described to direct working fluid under pressure to chamber 52 and therefore to chamber 77 of valve section 44 through the upstream orifice 79. Such fluid is transmitted past edge 76 to directional clutch selector valve 11 through conduit 17 but is initially blocked from being returned through conduit 19 for transmission to the directional clutch selector valve 12 by the neutral setting of speed selector valve 11. Thus although one of the speed clutches 18 may be engaged at this time, neither of the directional clutches 26 are engaged. Accordingly, the transmission as a whole is in neutral in that engagement of one of both types of clutches is necessary for transmitting torque through the transmission.

When a shift from neutral into a selected driving speed is initiated by manipulation of linkage 16, fluid in conduit 17 is directed to the selected one of the speed clutches 18 by selector valve 11 and a portion of the fluid is returned through conduit 19 where it is transmitted through control group valve section 46 to the direction selector control valve 12 and then to the selected one of the directional clutches 26. As indicated graphically in FIGURE 2, during the initial portion of the shift period, specifically during the first two tenths of a second in this example, the fluid pressures at both of the selected clutches 18 and 26 remain at a low value while the clutches fill with fluid without offering substantial resistance to the incoming fluid. It should be noted that both valve spool 44′ and spool 46′ are initially moved leftward and are in a fully open condition.

Following the fill period, both spools 44′ and 46′ move rightwardly as indicated in FIGURE 3 to meter the flow around their respective edges 76 and 92 in response to the pressure increase downstream of the edges which accompanies the beginning of engagement of the associated clutch. The load piston 89 of valve section 46 remains in its rightward position at first because of the flow restriction 99 which initially prevents significant fluid pressure from being exerted thereon. However the load piston 73 associated with control valve group section 44 does shift to the left as it experiences the initial pressure rise in chamber 94 of valve section 46 through passage 102.

At the moment when the fill period is completed and incoming fluid encounters the resistance which the clutches present to engagement, there is a tendency for sharp pressure peaks to occur, as indicated at 107 in FIGURE 2, and these are reflected back to the control valve group 33. Sharp pressure fluctuations 107 can interfere with the effectiveness of the control group in providing a smooth shift and it is desirable that these peaks be minimized. A pressure peak 107′ in the directional clutch fluid supply is particularly undesirable as this pressure strongly influences the modulation of both valve sections 44 and 46 as will hereinafter be discussed in more detail.

Load piston 73 functions as a volume absorber for such a pressure peak 107 to avoid effects on the desired pressure modulating operations and in addition absorbs fluid shocks from rightward movement of spool 46′. In particular, load piston 73 readily shifts leftwardly to function as a volume absorber for small surges of fluid entering chamber 94 of valve group section 46 in view of the low resistance passage 102 therebetween. A transverse notch 108 across the end of load piston 73, facing the outlet of passage 102, acts to facilitate this action.

Considering now the modulation portion of the shift period wherein the selected speed and directional clutches 18 and 26 are engaging, the incoming working fluid at each clutch is subject to increasing resistance resulting in pressure rises which are reflected back along fluid conduits 17 and 24, respectively. This would tend to close the spool valves 44′ and 46′ to prevent sufficiently rapid clutch engagement except for the continually increasing counter pressure exerted against load pistons 73 and 89.

In particular, when the pressure behind load piston 89 reaches a predetermined magnitude corresponding to the commencement of the modulation period of the directional clutch 26, 32 p.s.i. in this instance, the piston begins its leftward movement in response to such pressure as transmitted through the orifice 99 of check valve 101. Similarly, when the pressure in chamber 94 reaches a predetermined value, approximately 80 p.s.i. in this instance, the load piston 73 associated with spool valve 44′ moves leftwardly to increase the spring force on spool 44′. Thus the action of the valve spool 44′ is referenced to pressure conditions in the directional clutch 26 although it meters working fluid to the speed clutch and only indirectly to the directional clutch. At a slightly higher pressure, 100 p.s.i. in this instance, the load piston 73 contacts the adjacent end of valve spool 44′ as shown in FIGURE 3 at which time the position of the load piston no longer varies the spring force on valve spool 44′ whereby the edge 76 thereof functions as a pressure reducing and proportioning valve for the completion of the modulation period.

The flow restriction 99 of check valve 101 thus controls the rate of rise of the pressures at both selected clutches 18 and 26 as it controls the rate at which load piston 89 shifts leftwardly. When the pressure at the directional clutch has reached the predetermined maximum value, approximately 250 p.s.i. in this instance, the load piston 89 uncovers vent 106 as shown in FIGURE 4 and the pressure behind the load piston cannot rise any further. Thus the pressure rise at the directional clutch stops at this maximum value and the shift period is completed.

When the linkage 16 is again manipulated to initiate a subsequent shift of the transmission, the pressures in chambers 77, 78 and in passage 102 again drop to the low fill pressure previously described and check valve 101 again shifts leftwardly owing to the relatively high residual pressure remaining in passage 104. Thus the fluid pressure acting on load piston 89 is relieved to drain 103 and the valve control group 33 is conditioned for the subsequent fill and modulation period.

In the case of many vehicles, it is desirable that the transmission be neutralized when the brakes are applied. Referring now to FIGURE 1, a neutralizer valve 109 is shown which coacts with the control valve group 33 to perform this function automatically when the hydraulic brakes of the associated vehicle are actuated. Neutralizer valve 109 has a housing 111 with a working fluid inlet 112 coupled to the output of pump 31. Valve 109 further has a drain outlet 113 and an additional outlet 114 communicating with an opening 116 at control group housing 47 which faces the end of reaction slug 98 of valve section 46. Neutralizer valve 109 further has a spool 117 spring biased to a position where outlet 114 is communicated with drain 113. Thus with the spool 117 in this normal position, the neutralizer valve 109 does not effect the functioning of the valve group 33 as described above inasmuch as no pressure exists at opening 116 and such opening is closed by the adjacent end of reaction slug 98. A fluid pressure signal conduit 118 from the braking system of the associated vehicle connects with neutralizer valve housing 111 in a position to move spool 117 to connect working fluid inlet 112 with outlet 114 when a fluid pressure signal is received indicating the braking system has been actuated. Thus at such times as the vehicle brakes are actuated, working fluid is directed to control group opening 116 to force valve spool 46′ rightwardly. This movement communicates chamber 94 with a suitably placed drain outlet 119 to relieve the fluid pressure in chamber 94. This disengages the particular one of the directional clutches 26 which is actuated at that time thereby placing the transmission in neutral.

Considering now an important aspect of the above described construction of the control group 33, the orifices 79 and 81 which are upstream and downstream, respectively, of the edge 76 of valve spool 44′ have the effect of increasing of the flow capacity past edge 76 to shorten clutch fill times and thereby provide a minimum period of torque interruption through the transmission. During the initial portion of the shift, while the clutches are filling, it would be ideal to have the valve spool 44′ remain in its fully leftward position so that a maximum flow could pass edge 76 and rapidly fill the clutches. However this is not easily arranged for without disturbing the proper functioning of the valve spool 44′ as a modulated pressure reducer during the subsequent portions of the shift period. Because of the pressure drop on opposite sides of edge 76, the spool tends to shift to the right to meter fluid during the fill period in addition to performing this function as desired during the subsequent modulation period.

The effect of the orifices 79 and 81 is to decrease the pressure differential on opposite sides of edge 76 and therefore to maintain the spool 44′ in a more leftward position than would otherwise be the case whereby a greater flow may pass edge 76 during the fill portion of the shift transient. Under this condition, the flow of working fluid to the selected clutches 18 and 26 becomes a function of the large pressure differential between chamber 52 and outlet 36 rather than the reduced differential between chambers 77 and 78. To produce this result, the orifices 79 and 81 are constrictions of less cross sectional area than that of the flow passage around edge 76.

Figure 5:
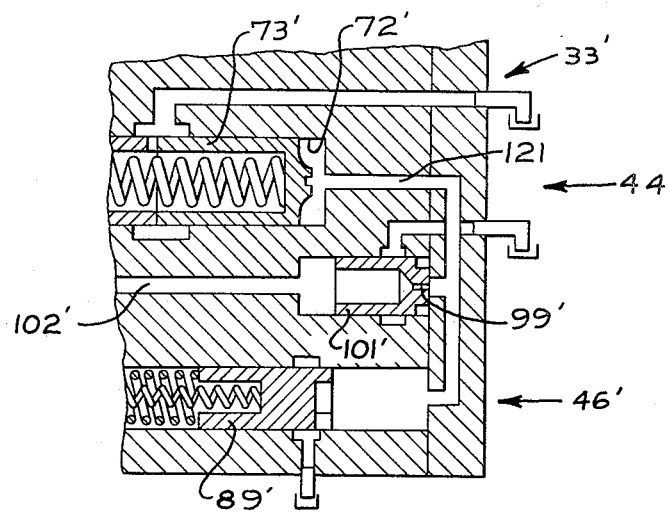
FIG. 5 is a diagrammatic view of a portion of the actuating fluid pressure control valve means illustrating a modified construction thereof.

Referring now to FIGURE 5, a portion of a modified valve control group 33' is shown illustrating a different arrangement for controlling the load piston 73' of valve section 44', the structure being similar to that described above except as hereinafter indicated. In this modification the passage 102" which transmits directional clutch pressure to the region of bore 72' behind load piston 73' does not communicate directly therewith but is connected thereto through a passage 121 which receives fluid through the orifice 99' of check valve 101' which orifice also supplies the load piston 89' of valve section 46' in the manner previously described. This has the effect of dampening the pressure peaks 107 which tend to occur at the conclusion of the fill period, as illustrated in FIGURE 2 to a still greater extent. In addition the slope of the rate of rise of speed clutch pressure is decreased as indicated by intermittent line 121' in FIGURE 2.

While the invention has been disclosed with respect to certain specific embodiments, it will be apparent that numerous modifications are possible and it is not intended to limit the invention except as defined in the following claims.

What is claimed is:

1. In a control system for a transmission which has first and second fluid actuated drive conditioning devices, the combination comprising:
   a source of working fluid for actuating said devices,
   a first pressure reducing valve having a fluid inlet coupled to said source and a fluid outlet coupled to said first drive conditioning device and having a fluid control signal inlet for admitting a variable fluid pressure signal to vary the pressure reduction within said first valve as a function of the pressure at said signal inlet,
   a second pressure reducing valve having a working fluid inlet receiving fluid transmitted through said first reducing valve and having an outlet communicated with said second drive conditioning device and having a control signal inlet for admitting a variable fluid pressure to vary the degree of pressure reduction in said second valve as a function of the pressure at said signal inlet thereof, and
   means transmitting fluid pressure rises at said second drive conditioning device to said signal inlets of both of said reducing valves.

2. The combination defined in claim 1 further comprising a flow orifice in the means for transmitting said pressure at said second drive conditioning device to said signal inlet of said second reducing valve for controlling the rates of pressure rise at said drive conditioning devices.

3. The combination defined in claim 1 wherein each of said reducing valves is comprised of a spool defining a variable flow passage, a biasing spring acting on said spool in a direction tending to increase the flow passage thereof, means causing the fluid pressure downstream of said flow passage to act upon said spool in a direction opposing the force of said biasing spring thereon, and a load piston acted upon by said fluid signal pressure to apply an increasing force on the associated spool as the pressure of said fluid signal increases, said load piston force being opposed to the downstream pressure force at each spool.

4. The combination defined in claim 3 wherein the load piston of said first reducing valve shifts into abutment with said spool thereof after a predetermined amount of travel in response to a rise of said fluid signal pressure and thereafter applies further rises of said signal pressure directly to said spool whereby said piston absorbs pressure surges prior to abutment against said piston.

5. The combination defined in claim 1 further comprising an upstream flow orifice in said working fluid inlet of said first reducing valve and a downstream flow orifice in said outlet thereof.

6. The combination defined in claim 1 further comprising a normally closed neutralizer valve having an inlet for receiving working fluid from said source and having an outlet communicating with one of said reducing valves for directing working fluid thereto to close said valve by the force of said working fluid thereon, and means for automatically opening said neutralizer valve when the brakes of the associated vehicle are applied.

7. The combination defined in claim 6 wherein said outlet of said neutralizer valve communicates with said second reducing valve to apply said fluid force thereto to disengage said second drive conditioning device.

8. The combination defined in claim 1 wherein said means for transmitting the fluid pressure at said second drive conditioning device to said fluid signal inlets of said first and second reducing valves has a flow orifice therein to control the rate of change of pressure reduction of said first and second reducing valves.

9. The combination defined in claim 8 wherein said flow restriction is defined by a movable check valve element, said check valve having a first position which is assumed in the presence of pressure at said second drive conditioning device at which said pressure is transmitted to said fluid signal inlet of said first and second reducing valve and having a second position which is assumed in response to the absence of pressure at said second drive conditioning device wherein both said fluid signal inlets are vented.

10. In a shifting control system for a transmission having a speed selector valve for directing fluid to a selected one of a plurality of speed establishing devices and having a directional selector valve for directing fluid to a selected one of a forward and a reverse drive conditioning device and having a source of working fluid therefor, the combination comprising:
   a first pressure reducing valve having a movable spool with an edge thereon defining a variable flow passage, and having means causing the fluid pressure downstream of said flow passage to act on said spool in a direction tending to reduce said passage and having a biasing spring acting on said valve spool in a direction opposed to the force of said fluid pressure thereon, said first pressure reducing valve further having a load piston acting on said spring and having a control signal pressure inlet for admitting a fluid pressure signal to shift said load piston into abutment with said spool in response to changes in the pressure of said fluid signal, said first reducing valve having an inlet for directing said working fluid past said edge and having an outlet for directing said working fluid to said speed selector valve;
   a second pressure reducing valve having a movable spool with an edge defining a variable flow passage and having means for causing the fluid pressure downstream of said edge to act on said spool in a direction tending to reduce said flow passage and having a biasing spring acting on said spool in a direction opposed to the force of said fluid pressure thereon, said second pressure reducing valve further having a load piston acting on said biasing spring to vary the force exerted thereby on said spool, said second reducing valve having a fluid signal inlet for admitting a fluid pressure to shift said load piston thereof to control the force exerted by said spring thereof on said spool thereof, said second reducing valve having an inlet receiving working fluid returned from said speed selector valve and having an outlet transmitting said fluid to said directional selector valve; and means defining a passage communicating the region downstream of said edge of said second reducing valve with said fluid signal inlets of said first and said second reducing valves.

11. The combination defined in claim 10 further comprising a fluid drain at said second reducing valve and positioned to vent the fluid signal pressure behind said load piston thereof after a predetermined travel thereof.

12. The combination defined in claim 10 wherein said inlet and outlet of said first reducing valve define flow orifices upstream and downstream of said edge thereof which orifices are constrictions relative to the flow passage around said edge thereof.

References Cited

UNITED STATES PATENTS

| | | | |
|---|---|---|---|
| 2,990,925 | 7/1961 | Bernotas | 192—4 |
| 3,017,974 | 1/1962 | Lasley | 192—4 |
| 3,050,165 | 8/1962 | Day et al. | 192—4 X |
| 3,181,667 | 5/1965 | Lohbauer et al. | 192—4 |
| 3,313,383 | 4/1967 | Tendresse | 192—4 |
| 3,334,530 | 8/1967 | Lamburn et al. | 74—781 |

ARTHUR T. McKEON, Primary Examiner

U.S. Cl. X.R.

74—754